(12) United States Patent
Hua et al.

(10) Patent No.: US 10,116,426 B2
(45) Date of Patent: Oct. 30, 2018

(54) METHODS AND SYSTEMS FOR FULL DUPLEX WIRELESS COMMUNICATIONS

(71) Applicant: The Regents of the University of California, Oakland, CA (US)

(72) Inventors: Yingbo Hua, Riverside, CA (US); Ping Liang, Riverside, CA (US)

(73) Assignee: The Regents fo the University of California, Oakland, CA (US)

( * ) Notice: Subject to any disclaimer, the term of this patent is extended or adjusted under 35 U.S.C. 154(b) by 221 days.

(21) Appl. No.: 14/378,093

(22) PCT Filed: Feb. 11, 2013

(86) PCT No.: PCT/US2013/025602
§ 371 (c)(1),
(2) Date: Aug. 11, 2014

(87) PCT Pub. No.: WO2013/120087
PCT Pub. Date: Aug. 15, 2013

(65) Prior Publication Data
US 2014/0348032 A1 Nov. 27, 2014

Related U.S. Application Data

(60) Provisional application No. 61/597,065, filed on Feb. 9, 2012, provisional application No. 61/597,067, filed on Feb. 9, 2012.

(51) Int. Cl.
*H04B 3/20* (2006.01)
*H04L 5/14* (2006.01)
(Continued)

(52) U.S. Cl.
CPC ............. *H04L 5/1461* (2013.01); *H04B 1/44* (2013.01); *H04B 7/15585* (2013.01);
(Continued)

(58) Field of Classification Search
CPC ........ H04B 1/44; H04B 7/14; H04B 7/15542; H04B 7/15585; H04L 5/143;
(Continued)

(56) References Cited

U.S. PATENT DOCUMENTS 6,429,798 B1 * 8/2002 Dent ....................... H04L 27/36
341/144
2004/0142700 A1 7/2004 Marinier
(Continued)

OTHER PUBLICATIONS

International Search Report on corresponding PCT application (PCT/US2013/025602) from International Searching Authority (KIPO) dated May 23, 2013.
(Continued)

*Primary Examiner* — Harun Chowdhury
(74) *Attorney, Agent, or Firm* — Klein, O'Neill & Singh, LLP

(57) ABSTRACT

A node of a full duplex wireless transmission system may include cancellation signal generation elements. The cancellation signal generation elements may extract a waveform from received signals, for example signals transmitted from the node, and use the waveform to generate a prefilter or cancellation signal to apply to further received signals. The cancellation signal may cancel interference in received signals caused by signals transmitted from the node.

8 Claims, 8 Drawing Sheets

(51) Int. Cl.
*H04B 7/155* (2006.01)
*H04L 25/03* (2006.01)
*H04B 1/44* (2006.01)
*H04L 5/00* (2006.01)

(52) U.S. Cl.
CPC .......... *H04L 5/143* (2013.01); *H04L 25/0328* (2013.01); *H04L 25/03885* (2013.01); *H04L 5/0023* (2013.01)

(58) Field of Classification Search
CPC ............... H04L 5/1461; H04L 25/0224; H04L 25/03305; H04L 25/03885; H04L 27/2601; H04L 25/0328
USPC ............... 370/277, 278, 286, 328, 329, 282; 375/220; 455/9, 570

See application file for complete search history.

(56) References Cited

U.S. PATENT DOCUMENTS

| | | | |
|---|---|---|---|
| 2008/0089397 A1* | 4/2008 | Vetter | H04L 27/366 375/220 |
| 2008/0107046 A1 | 5/2008 | Kangasmaa et al. | |
| 2010/0022201 A1 | 1/2010 | Vandenameele | |
| 2010/0232324 A1 | 9/2010 | Radunovic et al. | |
| 2011/0143655 A1* | 6/2011 | Ahn | H04B 7/15542 455/9 |
| 2012/0263078 A1* | 10/2012 | Tung | H04B 7/15564 370/277 |
| 2013/0089009 A1* | 4/2013 | Li | H04L 25/03305 370/278 |

OTHER PUBLICATIONS

Written Opinion on corresponding PCT application (PCT/ US2013/ 025602) from International Searching Authority (KIPO) dated May 23, 2013.

* cited by examiner

METHODS AND SYSTEMS FOR FULL DUPLEX WIRELESS COMMUNICATIONS

BACKGROUND OF THE INVENTION

The present invention relates generally to full duplex wireless communication, and more specifically to transmission and reception of information in the same frequency channel at the same time.

Prior art wireless networks such as 802.11a/b/g/n were designed for half duplex radios which limit the efficiency of bandwidth utilization and throughput, and increase the complexity of networking protocols. To achieve full duplex wireless communication, prior art wireless networks generally use separate frequency channels for transmitting and receiving, which increases the bandwidth requirement and reduces bandwidth efficiency.

Full duplex wireless networking capable of transmitting and receiving at the same time over the same frequency channel is highly desired because of its many advantages at both the physical layer and the MAC layer. An attempt was made to do so, as discussed in Jung Il Choic, Mayank Jain, Kaman Srinivasan, Philip Levis, Sachin Katti, "Achieving Single Channel, Full Duplex Wireless Communication," Proceedings of the Sixteenth Annual International Conference on Mobile Computing and Networking, (MobiCom '10), (Sep. 20-24, 2010), the disclosure of which is incorporated by reference. In the attempt, use was made of a combination of an RF noise cancellation chip QHx220 by Quellan, antenna cancellation by positioning two antennas with half-wavelength distance difference, and prior art digital interference cancellation, but failed to achieve acceptable results. Two possible reasons for this failure include that the QHx220 chip's design is based on phase-shifting and attenuating a sample of the transmitted signal to cancel out the transmitted signal at the receiving antenna. It is basically a linear vector modulator. The QHx220 noise canceller chip has an input pin that is connected to the transmitter's output to sample the transmitted RF analog signal. It shifts the phase and changes the amplitudes of the sampled signal to minimize the transmitted signal component in the received signal at the receiving antenna. The design principle of the QHx220 chip therefore limits its application to narrow band signals because it is difficult to achieve $\pi$ shift for all frequency components in a wide band signal. In addition, by positioning two transmitting antennas whose distances to the receiving antenna having a difference of half-wavelength $\lambda/2$ can only effectively cancel out signals at the center frequency with the wavelength $\lambda$.

BRIEF SUMMARY OF THE INVENTION

Aspects of the invention relate to full duplex wireless communications. One aspect of the invention provides a method useful for full duplex radio communications, comprising: transmitting a training signal by a node in a radio network; extracting a waveform from a version of the training signal obtained from a receive chain of the node; generating a cancellation signal using the waveform; and applying the cancellation signal to the receive chain of the node.

Another aspect of the invention provides a radio node, comprising: a transmit chain for transmitting a signal; a receive for receiving a signal; and cancellation elements including: waveform extraction circuitry coupled to the receive chain, the waveform extractor circuitry configured to extract a first basis waveform from information of a signal from the receive chain; memory for storing information of the first basis waveform; and waveform generation circuitry coupled to the memory and the receive chain, the waveform generation circuitry configured to generate a cancellation signal using information of the first basis waveform.

Another aspect of the invention provides a method useful for full duplex communications, comprising: transmitting one or more training signals from a radio node having at least two transmitters and at least one receiver; receiving at least one of the training signals by a receiver of the radio node; extracting a waveform in the time domain from the received training signal; defining a prefilter using the waveform; transmitting a signal prefiltered using the prefilter so as to reduce strength of a combined signal formed of received signals from the transmitters in a frequency band of interest.

These and other aspects of the invention are more fully comprehended upon review of this disclosure.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block represents both a method step or an apparatus element for performing the method step. Depending upon the implementation, the corresponding apparatus element may be configured in hardware, software, firmware or combinations thereof. In some aspects this application should be read in conjunction with U.S. Provisional Patent Application No. 61/597,065, filed Feb. 9, 2012, and U.S. Provisional Patent Application No. 61/597,067, filed Feb. 9, 2012, the disclosures of which are incorporated by reference, and to which this application claims priority.

Figure 1:
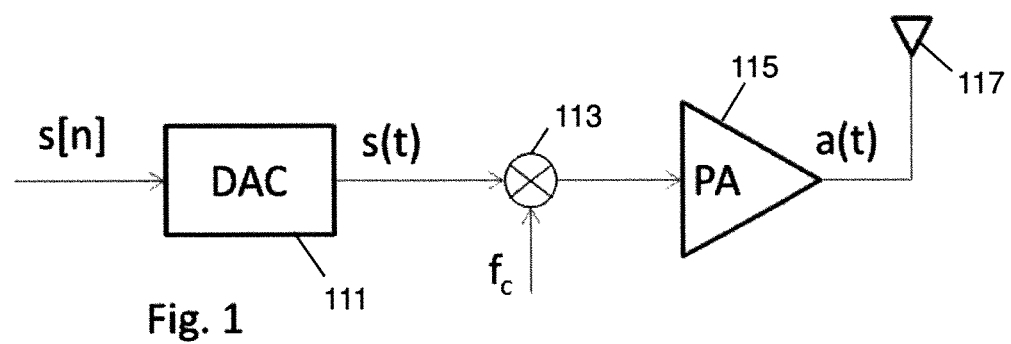
FIG. 1 is a block diagram of a prior art wireless transmitter.

A transmitting path in the last stage of a typical radio of a wireless networking device is shown in FIG. 1. The symbols s[n] may be complex and the real and imaginary components of s[n] after conversion to an analog signal by a digital-to-analog converter (DAC) 111 can be transmitted using a quadrature mixer 113 in which Re{s(n)} amplitude-modulates a carrier $f_c$ in a first path while Im{s(n)} amplitude-modulates the same carrier $f_c$ with a phase shift of 90 degrees in a second path. The two amplitude-modulated signals are summed and fed to a power amplifier 115 for transmission by an antenna 117.

The transmitted signal from the first transmitter is given by $$a(t)=GRe\{b(t)\exp(2\pi f_c t)\} \quad (1.1)$$

$$\text{where } b(t)=\Sigma_n s[n]p(t-nT) \quad (1.2)$$

is the baseband signal, G is the gain of the transmitter power amplifier PA, s[n] is the symbol sequence to be transmitted, and p(t) is the pulse waveform of the transmitter.

The self-interference from the first transmitter to the first receiver is given as $$r(t)=GRe\{y(t)\exp(2\pi f_c t)\} \quad (1.3)$$

$$\text{where } y(t)=h(t)*b(t)=\Sigma_n s[n]p(t-nT)*h(t) \quad (1.4)$$

is the baseband signal in the received signal r(t), and h(t) is the baseband channel impulse response from the transmitter to the receiver co-located in the same wireless device or in close proximity. Note that the carrier phase shift due to the channel is lumped into h(t). For a linear and time-invariant channel h(t), Eq. (1.4) can be expressed as $$y(t)=\Sigma_n s[n]q(t-nT) \quad (1.5)$$

where q(t)=p(t)*h(t). The channel h(t) may be time-varying, but the time-invariance assumption may hold well in a short time period and within that short time-invariance period, y(t) is a weighted sum of time-delayed pulses with the waveform q(t).

Single Transmitting Antenna

Figure 2:
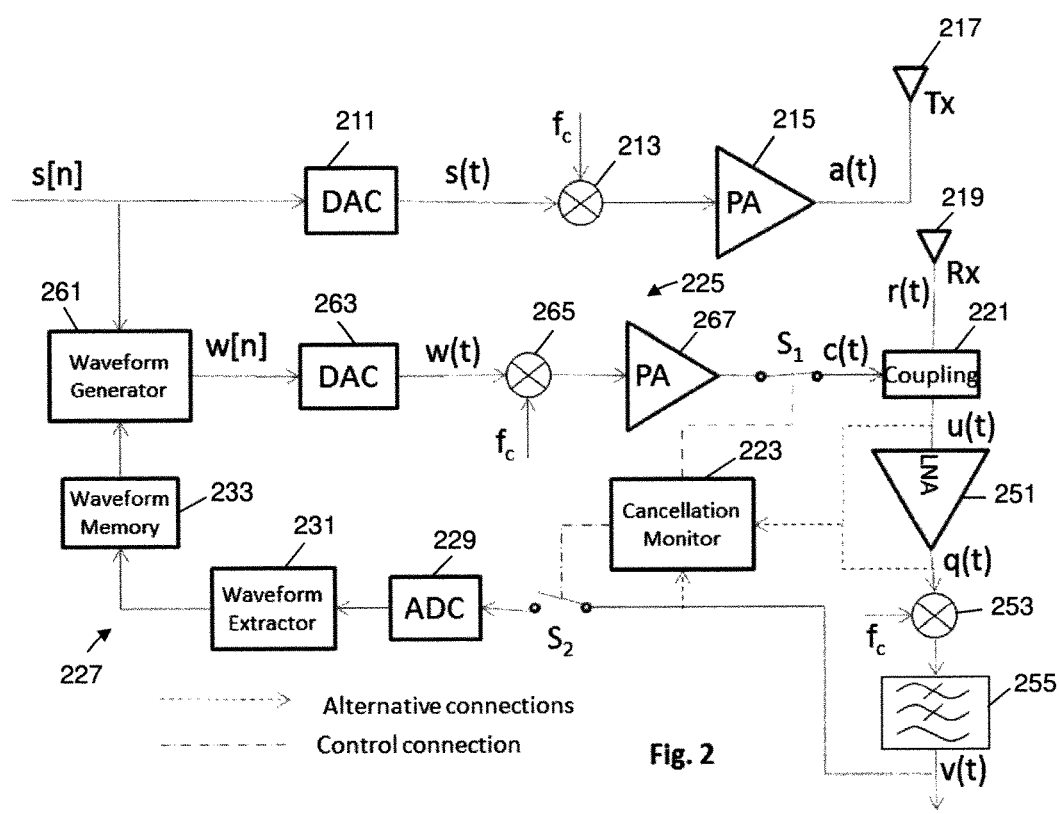
FIG. 2 is a block diagram of a full duplex radio with a single transmitting antenna and a single receiving antenna in accordance with aspects of the invention.

The case of a full duplex radio with a single first transmitting (Tx) antenna and a single first receiving (Rx) antenna may first be considered. A system with such an embodiment may acquire a first basis waveform of an interference signal received by the first Rx antenna caused by a signal transmitted from the first Tx antenna, and generate and couple a cancellation signal to the first Rx antenna or Rx circuit to cancel the first interference signal, with the cancellation signal generated from a weighted sum of time-delayed versions of a first basis waveform and coupled to the receiving antenna or receiving circuit using a circuit connection. The block diagram of an implementation of an embodiment for the cancellation of the transmitted signal from the first Tx antenna on the first Rx antenna of the same radio is shown in FIG. 2. In FIG. 2, a signal is processed for transmission by a transmit chain. More particularly, in FIG. 2 a signal s[n] converted to an analog signal s(t) by a DAC 211 upconverted by a mixer 213, generally in quadrature, and amplified by an amplifier 215 for transmission over Tx antenna 217.

A cancellation signal c(t) is coupled onto the Rx antenna or Rx circuit. In some embodiments the cancellation signal is coupled to the receiving circuit by way of the cable. In some embodiments the cable is coupled to the receiving circuit by way of an RF combiner or a T connection. The coupling of the cancellation signal c(t) onto an Rx antenna 219 or Rx circuit may be a direct circuit coupling 221 or through a directional coupler. One embodiment uses an isolator or directional coupler to couple c(t) onto the Rx antenna or Rx circuit to prevent the received signal from reaching the cancellation circuit. In another embodiment, a circulator or another isolator is used at the coupling to prevent the un-canceled portion of the cancellation signal c(t) from transmitting out of the Rx antenna.

One embodiment uses a cancellation monitor 223 which initiates a re-acquisition of a first basis waveform of the interference signal when a change in the RF environment and/or the transmitter causes interference remaining in the signal after cancellation to exceed a threshold. The cancellation monitor may sample the signal u(t), q(t) (after the signal q(t) is passed through a mixer 253) or v(t) (after the signal u(t) is downconverted to baseband by a mixer 253 and filtered by a filter 255) to detect the remaining interference signal after cancellation. Generally, the signal v(t) is a received signal processed by other reception chain circuitry to receive and process information transmitted by another radio. In many embodiments the LNA, mixer 253, and filter are also part of the receive chain, the other reception/cancellation elements being signal cancellation elements. The cancellation monitor may also accept a sample of the signal sent to the first Tx antenna for use in the detection of the remaining interference after cancellation.

In one embodiment, a cancellation circuit 225 is set to an off mode and a basis waveform acquisition circuit 227 is set to an acquisition mode. In FIG. 2, the acquisition of a first basis waveform of the interference signal comprises opening an electronic switch $S_1$ (e.g., by applying a gate voltage to a MOSFET) or setting the cancellation circuit to an off mode, and closing electronic switch $S_2$ or setting the basis waveform acquisition circuit to an acquisition mode, transmitting a pilot signal $a_\beta(t)=\beta Re\{p(t) \exp(2\pi f_c t)\}$ from the first Tx antenna, and receiving a signal $r_\beta(t)=\beta Re\{p(t)\exp(2\pi f_c t)*h(t)\}$ and recording the baseband signal $r_b(t)=p(t)*h(t)$ as the first basis waveform in a memory. In some embodiments, the above process is repeated multiple times, and the received signals are combined (e.g., averaged) to produce the first basis waveform of the interference signal to reduce the background noise component in the first basis of waveform. In one embodiment, when the cancellation monitor detects that change in the RF environment and/or transmitter causes the interference remaining in the signal after cancellation to exceed a threshold, the process for acquisition of first basis waveform of the interference signal is repeated and a new first basis waveform is recorded and used for interference cancellation. Note that the switches $S_1$ and switch $S_2$ not be implemented as actual electronic switches in a circuit, as long as the relevant circuit branch is in open circuit state or does not emit signals or draw signal power when it is not intended to be used.

In one embodiment, in the acquisition mode, an ADC 229 samples the received signal at a sufficiently high sampling rate and digitizes the sample values into a sequence of digital numbers from which the first basis waveform is extracted, for example by waveform extraction circuitry 231, and stored in a digital memory 233. In normal operation mode when the first transmitter is transmitting a signal and the first receiver is receiving a signal at the same time using the same frequency channel, the cancellation circuit is put to an operational mode to generate the cancellation signal. The cancellation signal may be formed by a) computing w[n], a sliding-window weighted sum of the first basis waveform using the symbols s[n] as the weights, for example using a waveform generator 261, b) converting w[n] to an analog signal w(t) using a DAC 263, c) upconverting the signal to $f_c$ using a mixer 265, and d) scaling the signal by G using an amplifier 267. Notationally, $$w(t)=-\Sigma_n s[n]r_b(t-nT)=-\Sigma_n s[n]q(t-nT)=-\Sigma_n s[n]p(t-nT)*h(t) \quad (1.6)$$

$$c(t)=G_c Re\{w(t)\exp(2\pi f_c t)\} \quad (1.7)$$

where $G_c$ is the gain of the cancellation circuit and is chosen such that $G_cC=G$ where C is the coupling coefficient that couples c(t) onto the first Rx antenna or Rx circuit. When the cancellation signal c(t) in Eq. (7) is coupled onto the Rx antenna or Rx circuit, it will cancel out the interference signal or major part of the interference signal given in Eqs. (1.3) and (1.4). Since the first basis waveform $r_b$ (t) is of finite length, the sliding-window summation in Eq. (1.6) may only need to be carried out over a small number of T intervals in which multiple time-delayed $r_b$(t–nT)'s that are overlapping are weighted and summed.

The power level β of the pilot signal $a_β(t)=βRe\{p(t)exp(2πf_ct)\}$ transmitted by the first Tx antenna for the acquisition of the first basis waveform is preferably made sufficiently low such that the received signal power at the first Rx antenna does not saturate the receiver circuit. With the assumption of a linear system and linear channel, the first basis waveform at higher transmitting power can be obtained by scaling the first basis waveform obtained at low transmission power. In general, the linearity assumption is a more accurate approximation if the first basis waveform is obtained using a transmission power level close to the normal operating point.

In one embodiment, an iterative process with a sequence of transmitting power levels $β_1<β_2<β_3<β_4$ . . . is used to obtain the first basis waveform at a high transmission power level or a transmission power level close to the not mal operating point. First, a signal with the lowest power level $β_1$ is transmitted from the first Tx antenna with $β_1$ chosen such that the receiver circuit can extract a first approximation $r_{b1}(t)$ of the first basis waveform without any cancellation signal. Then, a signal with power level $β_2>β_1$ is transmitted from the first Tx antenna and use the cancelation signal $c_{β2}(t)=-Cb_2Re\{r_{b1}(t) exp(2πf_ct)\}$ where $Cb_2=β_2$ to cancel the interference due to the transmitted signal at power level $β_2$. Let a scaled version of the received baseband signal after the cancellation be $r_{β2}(t)$ and update the first basis waveform to $r_{b2}(t)=r_{b1}(t)+r_{β2}(t)$. Next, a signal with power level $β_3>β_2$ is transmitted from the first Tx antenna and use the cancelation signal $c_{β3}(t)=-Cb_3Re\{r_{b2}(t) exp(2πf_ct)\}$ where $Cb_3=β_3$ to cancel the interference due to the transmitted signal at power level $β_3$. Let a scaled version of the received baseband signal after the cancellation be $r_{β3}$ (t) and update the first basis waveform to $r_{b3}(t)=r_{b2}(t)+r_{β3}(t)$. This process may be repeated k>1 steps until the power level $β_k$ reaches or is close to the normal operating level of the transmitting power of the first transmitter. In each step, the first basis waveform estimated from the previous step is used to generate a cancellation signal to cancel out major portion of the interference and the remaining signal is used to produce a new estimate of the first basis waveform at the higher power level.

Multiple Transmitting Antennas

The embodiments described in the previous section can be extended to a MIMO full duplex radio with $n_r$ Rx antennas and $n_t$ Tx antennas. In the discussion below only the scenario with multiple Tx antennas and a single Rx antenna is considered since the cancellation circuit for a single Rx antenna can be duplicated for each additional Rx antenna. In a full duplex radio with $n_t$ Tx antennas and a single Rx antenna, each Tx antenna transmits a signal $a^{(i)}(t)$ with a baseband signal $b^{(i)}(t)$ as given in Eqs. (1.1) and (1.2). The superscript (i) indicates the signals or parameters associated with the i-th transmitter. The self-interference from the $n_t$ Tx antennas to the Rx antenna is given as $$r(t)=\Sigma_{i=1}^{n_t}G^{(i)}Re\{y^{(i)}(t)exp(2πf_ct)\} \quad (1.8)$$

$$\text{where } y^{(i)}(t)=h^{(i)}(t)*b^{(i)}(t)=\Sigma_n s^{(i)}[n]p^{(i)}(t-nT)*h^{(i)}(t) \quad (1.9)$$

Figure 3:
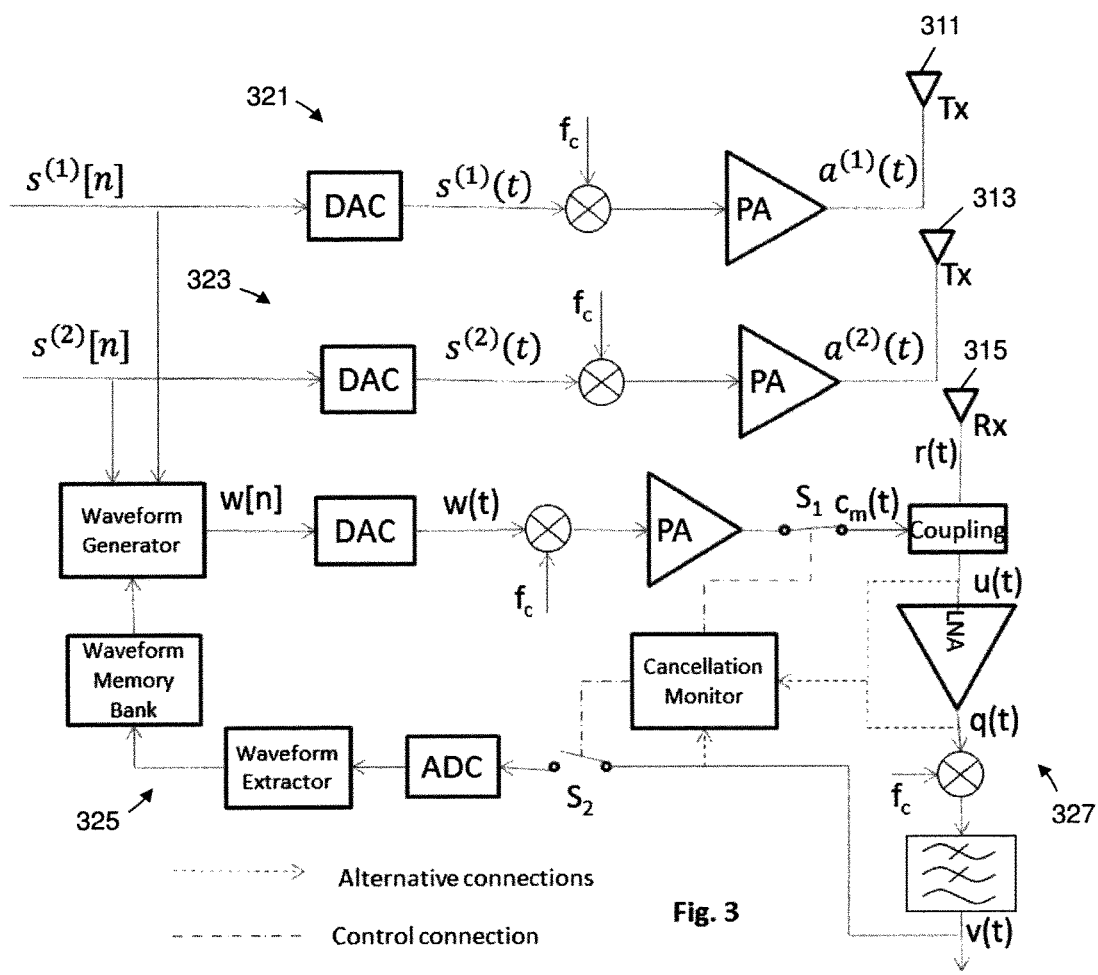
FIG. 3 is a block diagram of a full duplex radio with multiple transmitting antennas and a single receiving antenna in accordance with aspects of the invention.

To cancel the interference described in Eqs. (1.8) and (1.9), the process in the previous section for a single Tx antenna is duplicated $n_t$ times, one for each Tx antenna, and the cancellation signal is given by $$c_m(t)=-\Sigma_{i=1}^{n_t}G_c^{(i)}Re\{\Sigma_n s^{(i)}[n]r_b^{(i)}(t-nT)exp(2πf_ct)\}=-\Sigma_{i=1}^{n_t}G_c^{(i)}Re\{\Sigma_n s^{(i)}[n]p^{(i)}(t-nT)*h^{(i)}(t)exp(2πf_ct)\}=\Sigma_{i=1}^{n_t}Re\{c^{(i)}(t)\} \quad (1.10)$$

where $G_c^{(i)}C=G^{(i)}$ where C is the coupling coefficient that couples $c_m(t)$ onto the Rx antenna or Rx circuit. As shown in Eq. (1.10), the cancellation signal $c_m$ (t) is generated by summing the cancellation signal $c^{(i)}(t)=-G_c^{(i)}Re\{\Sigma_n s^{(i)}[n]p^{(i)}(t-nT)*h^{(i)}(t)exp(2πf_ct)\}$ for each Tx-to-Rx channel and each $c^{(i)}(t)$ is generated as a sliding-window summation over a number of T intervals of time-delayed first basis waveforms $r_b^{(i)}(t-nT)$ of the i-th Tx-to-Rx channel, in the same manner as in the embodiments in the previous section for a single Tx antenna and a single Rx antenna. When the cancellation signal $c_m(t)$ in Eq. (1.10) is coupled onto the Rx antenna or Rx circuit, it will cancel out the interference signal or major part of the interference signal from the $n_t$ Tx antennas given in Eqs. (1.8) and (1.9). A circuit implementing this embodiment is illustrated in FIG. 3 with two Tx antennas and a single Rx antenna 315. A first transmit chain 321 drives a signal for transmission on a first Tx antenna 313 and a second transmit chain 323 drives a signal for transmission on a second Tx antenna 313. The first and second transmit chains are similar to or the same as the transmit chain of FIG. 2. The cancellation signal is generated by signal cancellation elements 325. The signal cancellation elements are the same as or similar to the signal cancellation elements of FIG. 2. The cancellation signal elements receive a signal v(t), q(t), or v(t), from a location on a receive chain with portions 327 of the receive chain illustrated in FIG. 3 being the same as or similar to portions of the receive chain of FIG. 2. Similar to the single Tx antenna, the remaining interference can be further canceled by digital signal processing.

As shown in Eq. (1.10), in the multiple Tx antenna embodiment, a set of first basis waveforms, one for each Tx-to-Rx channel, $\{r_b^{(i)}(t-nT)\}_{i=1}^{i=n_t}$ is acquired and stored in a waveform memory bank to generate the combined cancellation signal. In one embodiment, the acquisition of first basis waveform of the interference signal from each Tx antenna is carried out separately, i.e., one transmitter, say the i-th transmitter, transmits via its antenna a pilot signal $a_β^{(i)}(t)=β^{(i)}Re\{p^{(i)}(t)exp(2πf_ct)\}$ from the i-th Tx antenna, and the Rx antenna receiving a signal $r_β^{(i)}(t)=β^{(i)}Re\{p^{(i)}(t)exp(2πf_ct)*h^{(i)}(t)\}$ and recording the baseband signal $r_b^{(i)}(t)=p^{(i)}(t)*h^{(i)}(t)$ as the first basis waveform for the i-th Tx-to-Rx channel in a memory. In one embodiment, the above process is repeated multiple times for each Tx-to-Rx channel, and the received signals are combined (e.g., averaged) to produce a first basis waveform of the interference signal for the i-th Tx-to-Rx channel to reduce the background noise component in the first basis of waveform. In another embodiment, when the Cancellation Monitor detects that change in the RF environment and/or one or more transmitters causes the interference remaining in the signal after cancellation to exceed a threshold, the process for acquisition of first basis waveforms of the interference signals is repeated and a new set of first basis waveforms is recorded and used for interference cancellation.

The iterative process with multiple transmitting power levels $β_1<β_2<β_3<β_4$ . . . described in the single Tx antenna section can also be extended to the multiple Tx antenna case.

The multiple Tx antenna and single Rx antenna case can be easily extended to the case with multiple Tx antennas and multiple Rx antenna by simply repeating the above process for each Rx antenna. When multiple Tx antennas and multiple Rx antennas are used in MIMO devices, the acquisition of the set of first basis waveforms may also be performed in parallel. The multiple Tx antennas may transmit pilot signals simultaneously and the multiple Rx circuits may separate out the signal sources and extract the first basis waveform for each Tx-to-Rx channel.

MIMO Prefilter Implementation

In a MIMO environment, the cancellation signals may be generated using prefilters. For each transmitted data packet subject to linear modulation, the signal transmitted from the k-th transmitter has the following form:

$$a_k(t) = Re\{b_k(t)\exp(2\pi f_c t)\} \quad (1.11)$$

where $b_k(t) = \sum_{i=1}^{I} g_k^{(i)}(t) \sum_{n=0}^{N-1} s^{(i)}[n] p(t-nT)$ (1.12)

is the (complex) baseband form of $a_k(t)$, $g_k^{(i)}(t)$ is the (complex) impulse response of the k-th waveform prefilter for data stream i, $s^{(i)}[n]$ is the (complex) symbol sequence for data stream i, N is the number of complex symbols (including the prefixed symbols such as those used in OFDM system) per stream, and p(t) is the fundamental waveform, which has bandwidth W and (effective) duration T. For high spectral efficiency, it is typical that T is equal to or only slightly larger than 1/W. For a broadband system, W can be any relatively large number (e.g., 20 MHz, 100 MH or larger).

The self-interference received by the l-th receiver is $$r_l(t) = Re\{y_l(t)\exp(2\pi f_c t)\} \quad (1.13)$$

where $$y_l(t) = \sum_{k=1}^{n_t} h_{l,k}(t) * x_k(t) \quad (14)$$

$$= \sum_{i=1}^{I} \left( \sum_{k=1}^{n_t} h_{l,k}(t) + g_k^{(i)}(t) \right) * \sum_{n=0}^{N-1} s^{(i)}[n] p(t-nT)$$

$$= \sum_{i=1}^{I} \sum_{k=1}^{n_t} h_{l,k}(t) * \sum_{n=0}^{N-1} s^{(i)}[n] g_k^{(i)}(t) * p(t-nT)$$

is the (complex) baseband form of $r_l(t)$, and $h_{l,k}(t)$ is the (complex) baseband channel impulse response from the k-th transmitter to the l-th receiver on the same radio.

To cancel the interference, $g_k^{(i)}(t)$, k=1, . . . $n_t$ is found such that $y_l(t)=0$ for all l=1, . . . $n_r$, or equivalently $\sum_{k=1}^{n_t} h_{l,k}(t) * g_k^{(i)}(t))=0$ for all l=1, . . . $n_r$. The matrix form of this condition is $$\begin{bmatrix} h_{1,1}(t) & \cdots & h_{1,n_t}(t) \\ \cdots & \cdots & \cdots \\ h_{n_r,1}(t) & \cdots & h_{n_r,n_t}(t) \end{bmatrix} \begin{bmatrix} g_1^{(i)}(t) \\ \cdots \\ g_{n_t}^{(i)}(t) \end{bmatrix} = \quad (1.14)$$

0 or equivalently $H(t) * g^{(i)}(t) = 0$

In one embodiment with $n_r$ receivers, $n_r$ cancellation circuits (one coupled to each Rx antenna or Rx circuit), and $n_t - n_r$ transmitters, the $n_r$ cancellation circuits may be considered as equivalent "transmitters" where the channel impulse response from each cancellation circuit to the coupled Rx antenna or Rx circuit is $\delta(t)$ subject to a scaling and zero for all other receivers. Arranging the cancellation circuit to be the first $n_r$ "transmitters" in Eq. (1.14), we have $h_{k,k}(t)=\delta(t)$ for k=1, . . . $n_r$ and $h_{l,k}(t)=0$ for l≠k and k=1, . . . $n_r$. This is because the k-th cancellation circuit is directly coupled to the k-th receiver and there is no over-the-air transmission from the $n_r$ cancellation circuit to the other l≠k receivers except for leakage which can be kept to negligibly small using proper shielding and layout. The H(t) matrix becomes $$H(t) = \begin{bmatrix} \delta(t) & & h_{1,n_r+1}(t) & \cdots & h_{1,n_t}(t) \\ & \cdots & \cdots & \cdots & \cdots \\ & & \delta(t) & h_{n_r,n_r+1}(t) & \cdots & h_{n_r,n_t}(t) \end{bmatrix} \quad (15)$$

And a solution to Eq. (14) is given by:

$$G(t) = \begin{bmatrix} -h_{1,n_r+1}(t) & \cdots & -h_{1,n_t}(t) \\ \cdots & \cdots & \cdots \\ -h_{n_r,n_r+1}(t) & \cdots & -h_{n_r,n_t}(t) \\ \delta(t) & & \\ & \cdots & \\ & & \delta(t) \end{bmatrix} \quad (16)$$

Note that in the last step of Eq. (1.14), all $g_k^{(i)}(t)$ appear in the format of $g_k^{(i)}(t)*p(t)$. Since components of G(t) are either $\delta(t)$, zero or $-h_{l,k}(t)$, there is no need to de-convolve $h_{l,k}(t)*p(t)$ to extract $h_{l,k}(t)$. We simply need to record the waveforms $h_{l,k}(t)*p(t)$ which are exactly the first basis waveforms described in the previous sections.

Using the Same Antenna for Transmitting and Receiving

In some instance the same antenna may sometimes be used for both transmitting and receiving signals. The transmitted signal is sampled, attenuated and phase-shifted so that it is equal in amplitude and anti-phase (π-shift) to the transmitter signal leaked onto the receiver input. This cancellation signal is coupled to the Rx circuit to cancel the transmitter leakage. The effectiveness and use of such approaches are limited to canceling narrow band signals and the need of bulky and/or expensive analog and microwave components to achieve the effect of phase shifting and amplitude attenuation.

Figure 4:
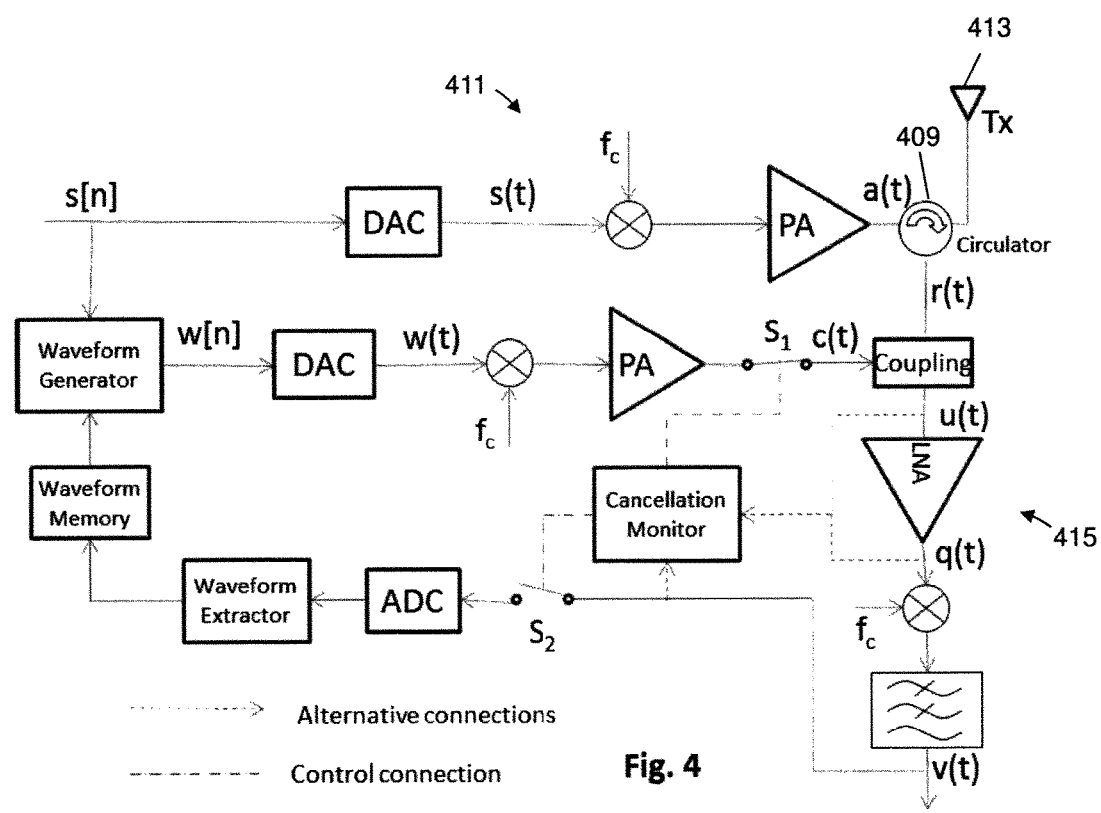
FIG. 4 is a block diagram of a full duplex radio with a single antenna for transmission and reception in accordance with aspects of the invention.

The embodiments of this invention described in the previous sections can be extended to an embodiment of a full duplex radio in which a single antenna is used for transmitting and receiving in the same frequency channel. One implementation of this embodiment is illustrated in FIG. 4, which is the same as FIG. 2 except a single antenna is used by both Tx and Rx and a circulator 409 is used to keep the transmitting path and receiving path separate. Thus, the embodiment of FIG. 4, a transmit chain 411 is used to provide a signal for transmission over an antenna 413, with the circulator coupling the transmission chain and the antenna. The transmit chain may be the same as or similar to the transmit chain of FIG. 2. A signal received by the antenna is provided, by way of the circulator, to portions of a receive chain 415, which also may be the same as or similar to the portions of the receive chain of FIG. 2. In addition, an isolator may be inserted before the cancellation signal is coupled to the receiving circuit to prevent the received signal from reaching the cancellation circuit.

In this embodiment, the acquisition of the first basis waveform of the interference signal, the generation and coupling of the cancellation signal to cancel out the interference can be achieved in the same manner as in the single Tx antenna and single Rx antenna embodiments. The cancellation signal is coupled to the input to the receiver amplifier to cancel out the transmitter signal leaked onto the receiver input. The iterative process of acquiring the first basis waveform for the interference signal using increasing transmitting power levels $\beta_1 < \beta_2 < \beta_3 < \beta_4 \ldots$. And the process of acquiring multiple versions of the first basis waveform to remove background noise components can also be used in the embodiment with a single antenna for both Tx and Rx.

The embodiment with a single antenna for Tx and Rx and the embodiments with separate Tx antenna(s) and Rx antenna(s) can be combined to produce an embodiment of a MIMO full duplex radio in which one or more of the antennas function as both Tx and Rx antenna and the other antenna(s) function as either Tx or Rx.

In all the above preferred embodiments, the cancellation signal in RF is coupled to the Rx antenna prior to the LNA of the receiver, between r(t) and u(t) in FIGS. 2, 3 and 4. Alternatively, if high dynamic range LNA is available, the cancellation signal in baseband form may be coupled to the baseband signal at v(t) in FIGS. 2, 3 and 4 to cancel the interference in baseband instead of in RF. Further, the above embodiments can be extended to different modulation schemes.

In some embodiments with $n_r \geq 1$ RF (radio frequency) receivers and $n_t > n_r$ RF transmitters, the waveform prefilters can be used to remove self-interferences from the transmitters to the receivers on the same radio at the RF frontend, thus allowing the transmitters and the receivers placed in close proximity on the same radio to receive up to $n_r$ streams of data and transmit up to $n_t - n_r$ streams of data at the same time using the same frequency channel. The broadband waveform prefiltering method of this application works for any channel response characteristics of the self-interferences. One embodiment uses primary and secondary antennas in which the secondary antennas are used for interference cancelation with low power and the primary antennas (mainly directional) are used for either receiving or transmitting data depending on the flow direction that the relay serves.

In some embodiments a class of channel-response matched broadband waveform prefiltering may be used for broadband full-duplex radios.

In one embodiment, a radio has $n_r$ RF (radio frequency) receivers and $n_t$ RF transmitters. In order to achieve full-duplex, part of the transmit freedoms is used to cancel RF self-interferences at all receivers. With self-interferences removed (or nearly removed) from all receivers at the very RF frontend, the desired signals to be received are kept within the dynamic range of the receivers and the linearity of the system is preserved. Any residual self-interferences can be further canceled by a follow-up baseband signal processing.

Broadband Data Transmission

In one embodiment, for each transmitted data packet subject to linear modulation, the signal transmitted from the kth transmitter has the following form:

$$y_k(t) = Re\{x_k(t) \exp(j2\pi f_c t)\} \quad (2.1)$$

where $$x_k(t) = \Sigma_i^I g_k^i(t) * \Sigma_{n=0}^{N-1} s_n^{(i)} p(t-nT) \quad (2.2)$$

is the (complex) baseband form of $y_k(t)$, $g_k^i(t)$ is the (complex) impulse response of the kth waveform prefilter for data stream i, $s_n^{(i)}$ the (complex) symbol sequence for data stream i, N is the number of complex symbols (including the prefixed symbols such as those used in OFDM system) per stream, and p(t) is the fundamental waveform, which has bandwidth W and (effective) duration T For high spectral efficiency, it is typical that T is equal to or only slightly larger than 1/W. For a broadband system, W can be any relatively large number (e.g., 20 MHz, 100 MHz or larger).

The self-interference received by the lth receiver is $$v_l(t) = Re\{u_l(t) \exp(j2\pi f_c t)\} \quad (2.3)$$

where $$u_l(t) = \Sigma_{k=1}^{n_t} h_{l,k}(t) * x_k(t) = \Sigma_{i=1}^I ([\Sigma_{k=1}^{n_t} h_{l,k}(t) * g_k^{(i)}(t)] * \Sigma_{n=0}^{N-1} s_n^{(i)} p(t-nT)) \quad (2.4)$$

is the (complex) baseband form of $v_l(t)$, and $h_{l,k}(t)$ is the (complex) baseband channel impulse response from the kth transmitter to the l-th receiver on the same radio.

We need to find $g_k^{(i)}(t)$, $k=1, \ldots, n_t$, such that $u_l(t)=0$ for all $l=1, \ldots, n_r$, or equivalently $\Sigma_{k=1}^{n_t} h_{l,k}(t) * g_k^{(i)}(t)=0$ for all $l=1, \ldots, n_r$. The matrix form of this condition is $$\begin{bmatrix} h_{1,1}(t) & \ldots & h_{1,n_t}(t) \\ \ldots & \ldots & \ldots \\ h_{n_r,1}(t) & \ldots & h_{n_r,n_t}(t) \end{bmatrix} \begin{bmatrix} g_1^{(i)}(t) \\ \ldots \\ g_{n_t}^{(i)}(t) \end{bmatrix} = 0 \text{ or equivalently } \mathbb{H}(t) * g^{(i)}(t) = 0 \quad (2.5)$$

Broadband Waveform Prefiltering

In one embodiment, the notions of vector space in the field of functions is used to handle the problem of Eqn. (2.5). n vectors of functions $\{f_1(t), \ldots, f_n(t)\}$ may be said to be convolutively independent if $\Sigma_{i=1}^n a_i(t) * f_i(t) = 0$ implies $a_1(t) + \ldots + a_n(t) = 0$. The rank $r\mathbb{H}(t)$ of the $\mathbb{H}(t)$ is the largest number of columns (or rows) in $\mathbb{H}(t)$ that are convolutively independent. It follows that $r\mathbb{H}(t) \leq \min\{n_r, n_t\}$. The dimension of the solution space of (2.5), which is also called the dimension of the (right) null space of $\mathbb{H}(t)$, is the number of convolutively independent solutions to (2.5), which is always $d_{null} = n_t - r\mathbb{H}(t)$. In general, $d_{null} \geq n_t - \min\{n_r, n_t\}$. If $d_{null} = n_t - \min\{n_r, n_t\}$ we call it a typical case (very likely in practice), or otherwise if $d_{null} > n_t - \min\{n_r, n_t\}$, atypical case (not very likely in practice). To ensure $d_{null} \geq 1$ in both cases, we choose $n_t > n_r$.

Embodiments with $I = n_t - n_r$ convolutively independent solutions for g(t) of (2.5) are shown below:

If $n_r=1$ and $n_t=2$ where $I=1$, a solution for g(t) is $$g^{(1)}(t) = [h_{1,2}(t), -h_{1,1}(t)]^T \quad (2.6)$$

If $n_r=1$ and $n_t=3$ where $I=2$, a pair of two convolutively independent solutions for g(t) are $$g^{(1)}(t) = [h_{1,2}(t), -h_{1,1}(t), 0]^T \quad (2.7)$$

$$g^{(2)}(t) = [h_{1,3}(t), 0, -h_{1,1}(t)]^T \quad (2.8)$$

If $n_r=1$ and $n_t=4$ where $I=3$, a pair of two convolutively independent solutions for g(t) are $$g^{(1)}(t) = [h_{1,2}(t), -h_{1,1}(t), 0, 0]^T \quad (2.9)$$

$$g^{(2)}(t) = [h_{1,3}(t), 0, -h_{1,1}(t), 0]^T \quad (2.10)$$

$$g^{(3)}(t) = [h_{1,4}(t), 0, 0, -h_{1,1}(t)]^T \quad (2.11)$$

If $n_r=2$ and $n_t=3$ where I=1, a solution for g(t) is $$g^{(1)}(t) = \begin{bmatrix} -h_{2,2}(t)*h_{1,3}(t) + h_{1,2}(t)*h_{2,3}(t) \\ h_{2,1}(t)*h_{1,3}(t) - h_{1,1}(t)*h_{2,3}(t) \\ h_{1,1}(t)*h_{2,2}(t) + h_{1,2}(t)*h_{2,1}(t) \end{bmatrix} \quad (2.12)$$

If $n_r=2$ and $n_t=4$ where I=2, a pair of two convolutively independent solutions for g(t) are $$g^{(1)}(t) = \begin{bmatrix} -h_{2,2}(t)*h_{1,3}(t) + h_{1,2}(t)*h_{2,3}(t) \\ h_{2,1}(t)*h_{1,3}(t) - h_{1,1}(t)*h_{2,3}(t) \\ h_{1,1}(t)*h_{2,2}(t) + h_{1,2}(t)*h_{2,1}(t) \\ 0 \end{bmatrix} \quad (2.13)$$

$$g^{(2)}(t) = \begin{bmatrix} -h_{2,2}(t)*h_{1,4}(t) + h_{1,2}(t)*h_{2,4}(t) \\ h_{2,1}(t)*h_{1,4}(t) - h_{1,1}(t)*h_{2,4}(t) \\ 0 \\ h_{1,1}(t)*h_{2,2}(t) + h_{1,2}(t)*h_{2,1}(t) \end{bmatrix} \quad (2.14)$$

In general, for $n_t > n_r \geq 1$, the ith of a set of $I=n_t-n_r$ convolutively independent solutions for g(t) of (2.5) is such that $$g^{(i)}(t) = \begin{bmatrix} \bar{g}^{(i)}t \\ O_{i-1,1} \\ g_O^{(i)}(t) \\ O_{I-i,1} \end{bmatrix} \quad (2.15)$$

where $O_{m,1}$ is the m×1 zero vector, and $\bar{g}^{(i)}t$ and $g_O^{(i)}(t)$ are a solution to $$A(t)*\bar{g}^{(i)}t + b_i(t)*g_O^{(i)}(t) = 0 \quad (2.16)$$

where A(t) is a square matrix equal to H(t) without its last $n_t-n_r$ columns, and $b_i(t)$ is the $(n_r+i)$th column of H(t). The solution $$\bar{g}^{(i)}t = -A(t)^{-1}*b_i(t)*g_O^{(i)}(t) \quad (2.17)$$

with $g_O^{(i)}(t)=\det\{A(t)\}$ may be chosen. Here, the inverse $A(t)^{-1}$ and determinant $\det\{A(t)\}$ are computed in the same way as the conventional inverse and determinant except that all multiplications are substituted by convolutions.

Among all possible sets of convolutively independent solutions to (2.5), there is one which has the shortest length (shortest time duration). The solutions shown above are not necessarily the solutions with shortest length. Methods for finding the shortest solutions are addressed below.

Although the above solutions (2.9)-(2.17) are valid for arbitrary H(f), they forms if $h_{k,k}(t)$ for $k=1, \ldots, n_r$ are the strongest (i.e., producing the strongest signal) among all $h_{l,k}(t)$ for $l=1, \ldots, n_r$. This condition can be always met by properly indexing the transmitters with respect to the receivers.

Prefilter Implementation Methods

In the above embodiments, the self-interference channel response $h_{l,k}(t)$ is assumed arbitrary (subject to the double-sided bandwidth W) and available. One embodiment obtains $h_{l,k}(t)$ online by using a training period during which $h_{l,k}(t)$ is calibrated. The pilot used for training can be chosen in many different ways. One embodiment uses a pulse much narrower than the pulse p(t) used for data transmission. In this case, the received signal is simply $h_{l,k}(t)$ (between transmitter k and receiver l). In another embodiment that uses the data transmission pulse p(t) for training, the received waveform is $p(t)*h_{l,k}(t)$. The embodiment uses deconvolution to extract $h_{l,k}(t)$ from the received waveform $p(t)*h_{l,k}(t)$.

In the embodiment with $n_r=1$, there is no need to compute $h_{l,k}(t)$ from $p(t)*h_{l,k}(t)$. This is because we can use $p(t)*h_{l,k}(t)$ directly to generate (2.1) where $$x_k(t)=\Sigma_i^I g_k^{(i)}(t)*\Sigma_{N=0}^{N-1}s_n^{(i)}p(t-nT)=\Sigma_i^I\Sigma_{n=0}^{N-1}s_n^{(i)}[g_k^{(i)}(t)*p(t-nT)] \quad (2.18)$$

and $g_k^{(i)}(t)*p(t)$ is either zero or identical to one of $p(t)*h_{l,k}(t)$.

Another embodiment avoids the computation of $h_{l,k}(t)$ from $p(t)*h_{l,k}(t)$ by the following method. Denote $\hat{h}_{l,k}(t)=p(t)*h_{l,k}(t)$, which is the waveform measured by receiver l in response to the pulse p(t) from transmitter k. If $h_{l,k}(t)$ is replaced by $\hat{h}_{l,k}(t)$ in (9)-(17) for all l and k, then $g_k^{(i)}(t)$ is replaced by $\hat{g}_k^{(i)}(t)=g_k^{(i)}(t)[*p(t)]^{n_r}$. Here, for example, $g_k^{(i)}(t)[*p(t)]^2$ is equivalent to $g_k^{(i)}(t)*p(t)*p(t)$. During data transmissions, we let transmitter k (for all k) transmit $$y_k(t)=Re\{\hat{x}_k(t)\exp(j2\pi f_c t)\} \quad (2.19)$$

where $$\hat{x}_k(t)=\Sigma_i^I\Sigma_{n=0}^{N-1}s_n^{(i)}\hat{g}_k^{(i)}(t-nT) \quad (2.20)$$

It is easy to verify that $\hat{x}_k(t)=x_k(t)[*p(t)]^{n_r-1}$.

It is useful to place $n_r$ of the total $n_t$ transmitters closer to the $n_r$ receivers, pairwisely, than other $n_t-n_r$ transmitters. In this way, the closer transmitters need to consume less power for interference cancelation and at the same time cause less interference to other receivers. This arrangement of transmitters also leads to the desired condition for the solutions (2.9)-(2.17), i.e., $h_{k,k}(t)$ for $k=1, \ldots, n_r$ are the strongest among all $h_{l,k}(t)$ for $l=1, \ldots, n_r$ and $k=1, \ldots, n_t$.

One embodiment uses a cancelation monitor which initiates a re-calculation of the prefilters when change in the RF environment causes the interference remaining in the signal after cancellation to exceed a threshold.

Effect of Waveform Prefilters on Channels Between Nodes in Wireless Relaying

A radio with waveform prefilters satisfying (2.5) may be used as full-duplex wireless relay. In such an embodiment, the channel between a source node (Node A) and the relay is virtually interference free. The quality of the channel between Node A and the relay in full-duplex mode is identical to that between Node A and the relay in half-duplex mode (provided that the same number of receivers are used for both modes).

When $n_t$ transmitters of the relay transmit the signals as shown in (2.1), $\tilde{n}_r$ receivers at a destination (Node B) receive $$\tilde{v}_l(t)=Re\{\tilde{u}_l(t)\exp(j2\pi f_c t)\} \quad (2.21)$$

where $$\tilde{u}_l(t)=\Sigma_{k=1}^{n_t}\tilde{h}_{l,k}(t)*x_k(t)=\Sigma_{i=1}^I([\Sigma_{k=1}^{n_t}\tilde{h}_{l,k}(t)*g_k^{(i)}(t)]*\Sigma_{n=0}^{N-1}s_n^{(i)}p(t-nT)) \quad (2.22)$$

where $l=1, \ldots, \tilde{n}_r$ and $\tilde{h}_{l,k}$ is the baseband channel impulse response between the kth transmitter of the relay and the lth receiver on Node B. The effective channel matrix between the I streams of data from the relay and the $\tilde{n}_r$ receivers at Node B is $$\tilde{H}(t) = \begin{bmatrix} \sum_{k=1}^{n_t} \tilde{h}_{l,k}(t) * g_k^{(1)}(t) & \cdots & \sum_{k=1}^{n_t} \tilde{h}_{l,k}(t) * g_k^{(I)}(t) \\ \cdots & \cdots & \cdots \\ \sum_{k=1}^{n_t} \tilde{h}_{\tilde{n}_r,k}(t) * g_k^{(1)}(t) & \cdots & \sum_{k=1}^{n_t} \tilde{h}_{\tilde{n}_r,k}(t) * g_k^{(I)}(t) \end{bmatrix} \quad (2.23)$$

The quality of this channel matrix depends on $\tilde{h}_{l,k}(t)$, which is independent of $h_{l,k}(t)$. To ensure that all I streams of data can be received by Node B, we need $I \le \tilde{n}_r$.

With given $g_k^{(i)}(t)$ for all i and k, the channel matrix $\tilde{H}(t)$ can also be calibrated online. Another (inner) layer of waveform prefiltering can be applied as in the conventional transmit beamforming for MIMO channels.

Antennas for Full-Duplex Wireless Networking

In practice, the number of antennas on each relay node is limited. If there are total N omnidirectional antennas on the relay, a full-duplex mode with transmit antenna beamforming for self-interference cancelation may use $n_r$ antennas for receiving and $N-n_r$ antennas for self-interference cancelation and transmitting. If the relay is restricted to receive the same number of independent streams as it transmits, we need $N-n_r \ge 2n_r$, i.e., $N \ge 3n_r$, which allows $n_r = N/3$ independent streams through the relay.

For comparison, in the half-duplex mode where the relay receives using all N antennas and, in another channel, transmits using all N antennas, the effective number of streams per channel is also N/2.

Therefore, it seems reasonable to say that if all antennas on the relay are omnidirectional, the half-duplex mode is a better choice than the full-duplex mode in terms of the antenna usage and implementation complexity.

Figure 5:
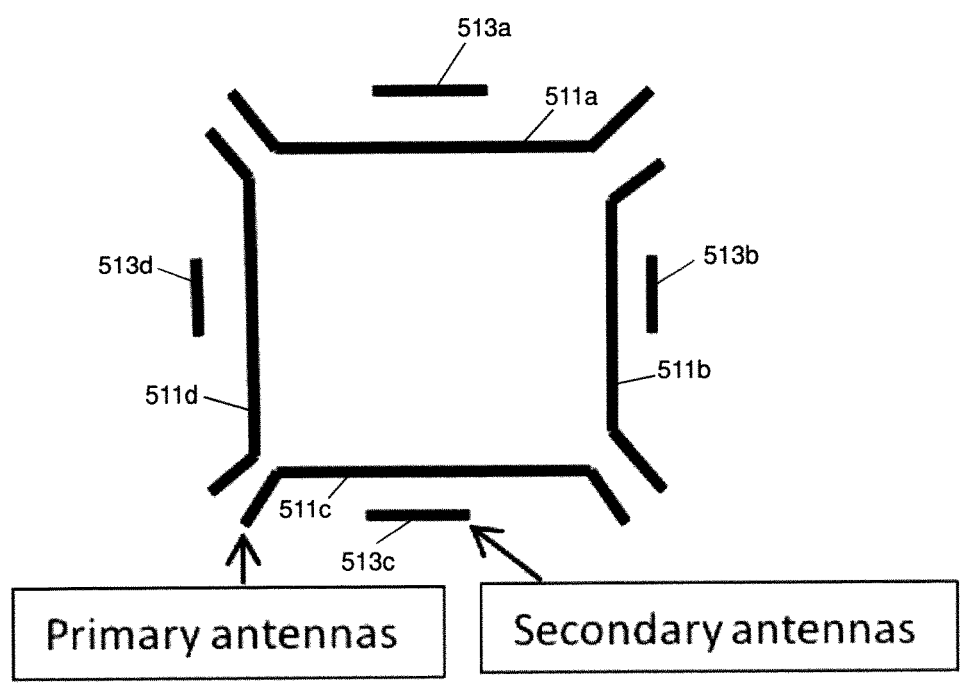
FIG. 5 illustrates antenna useful in embodiments of the invention.

However, in practice, there are many types of antennas that do not have the omnidirectional property, i.e., they are directional. Directional antennas can provide much improved network spectral efficiency than omnidirectional antennas. One embodiment uses relays equipped with directional antennas. Illustrated in FIG. 5 is an example of such an embodiment of a relay with 4 primary antennas 511a-d and 4 secondary antennas 513a-d.

One embodiment uses directional primary antennas for transmitting and lower power secondary antennas for canceling self-interference. The primary antennas are directional with primary beams pointing outwards from the relay or in such a way that the set of transmitting antennas primary beams are pointing away from the set of antennas that are receiving. In one embodiment, each of the primary antennas can be used for receiving or transmitting depending on the direction of the intended source or destination node. When the signal power of the source node is mainly from a first direction, e.g., from northeast, and the destination node can be reached by transmitting mainly to a second direction, e.g., to the southeast, the two primary antennas facing the first direction are used for receiving and the two primary antennas facing the second direction are used for transmitting.

Directional antennas in practice are not ideal, and their RF transmission will leak in all directions, although the signal power in the back zone is significantly lower than in the front zone. The secondary antennas for self-interference cancelation can be made to work cooperatively with the primary antennas to eliminate the self-interference from the transmitting primary antennas to the receiving primary antennas during full-duplex mode. The methods presented earlier apply here directly.

Figure 6:
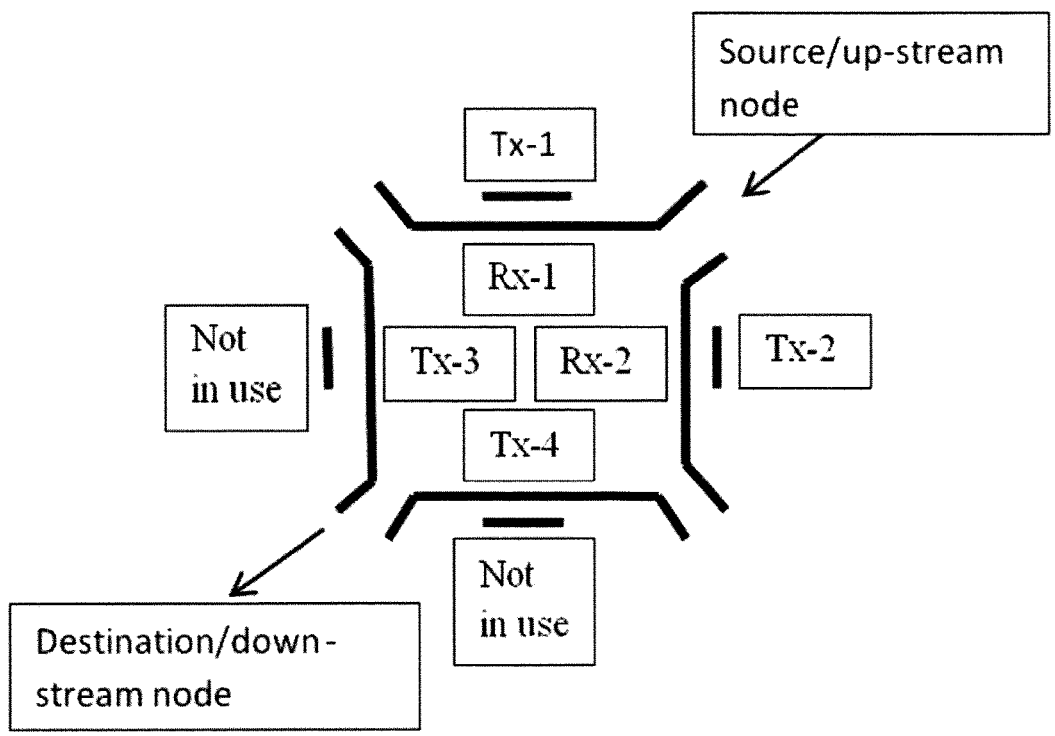
FIG. 6 illustrates antenna useful in embodiments of the invention.

In the example illustrated in FIG. 4, when the relay serves a traffic flow from a first direction (northeast) to a second direction (southwest) which is opposite or approximately opposite to the first direction, there are two receivers (corresponding to the two primary antennas on the northeast of the relay) and four transmitters (corresponding to the two secondary antennas on the northeast of the relay and the two primary antennas on the southwest of the relay), as shown in FIG. 6. Since the power of leakage in the back zone is relatively small compared to the transmitted power of the primary beams in the front zone, the power consumed by (and emitted from) the secondary antennas for interference cancelation is relatively small compared to that from the transmitting primary antennas.

Figure 7:
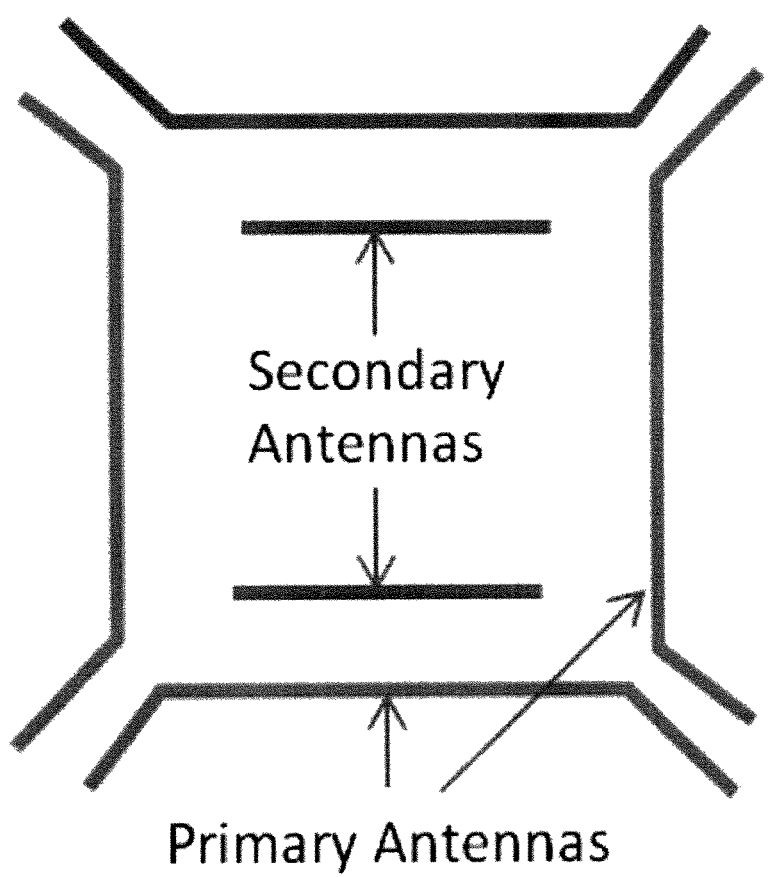
FIG. 7 illustrates antenna useful in embodiments of the invention.

Another embodiment places the secondary antennas in the back zone of the transmitting primary antennas. In this case, one set of secondary antennas can be used to cancel interference from any pair of neighboring transmitting and receiving antennas. One example is illustrated in FIG. 7. Only two secondary antennas are needed to cancel the interference from any two transmitting primary antennas to the other two primary receiving antennas. In comparison to the configuration in FIG. 6, it eliminates the two idle secondary antennas.

Figure 8:
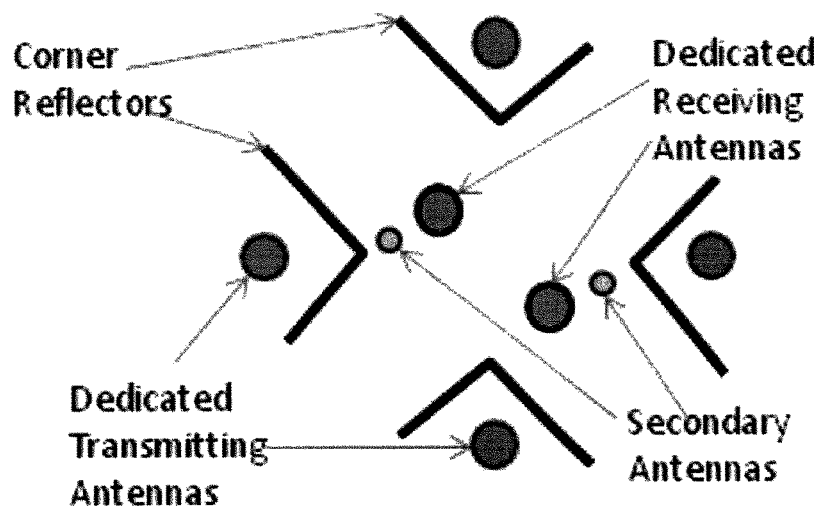
FIG. 8 illustrates antenna useful in embodiments of the invention.

In yet another embodiment, multiple dedicated directional antennas are used for transmission and dedicated receiving antennas are placed in the common area of the back zones of the transmitting antennas and secondary antennas for interference cancellation are placed adjacent to the dedicated receiving antennas to cancel the interference from the back zone leakage from the multiple dedicated directional transmitting antennas. An example embodiment with four directional transmitting antennas and two dedicated receiving antennas and two secondary antennas for interference cancellation is shown in FIG. 8, in which a corner reflector is used to create a back zone for a transmitting antenna. The corner reflectors serve to both steer the signal power of the dedicated directional transmitting antennas away from the back zone where the dedicated receiving antennas are located, and shield the signal power from the secondary antennas away from the dedicated directional transmitting antennas.

Shortening of Prefilters

The prefilters discussed earlier are not the shortest possible although they are easy to construct and convenient for practical use. In this section, embodiments for shortening the prefilters $g_k^{(i)}(t)$ without losing its effectiveness on interference cancelation are presented.

Shortening a Given Vector of Prefilters

First, consider a given vector $g^{(i)}(t)$ of prefilters for stream i as discussed earlier. To preserve the desirable zero entries in $g^{(i)}(t)$, the zero entries can be removed from $g^{(i)}(t)$ and the resulting $(n_r+1) \times 1$ vector can be named as $q^{(i)}(t)$. For convenience, the superscript (i) will be dropped. Subject to the double-sided bandwidth W, we can use a sampling rate $f_s \ge W$ can be used to convert q(t) into a vector sequence q[l] for l=0, ..., L where L is the effective length (or order) of q[l]. There is a one-to-one mapping between the sequence q[l] and its Z-transform $q\{z\} = \sum_{l=0}^{L} q[l] z^{-1}$. In one embodiment, the goal is to find $\bar{q}\{z\}$ with the shortest possible order $\bar{L} \le L$ such that $$q\{z\} = \bar{q}\{z\} a\{z\} \quad (2.24)$$

where $a\{z\}$ is a scalar polynomial of order $L - \bar{L}$. The equation (24) is equivalent to $$r_q(n) = r_{\bar{q}}(n) r_a(n + \bar{L}) \quad (2.25)$$

where $$\tau_q(n) = \begin{bmatrix} q[0] & \cdots & q[L] & & \\ & \cdots & \cdots & \cdots & \\ & & q[0] & \cdots & q[L] \end{bmatrix} \in C^{n(n_r+1)\times(n+L)}$$

$$\tau_{\bar{q}}(n) = \begin{bmatrix} \bar{q}[0] & \cdots & \bar{q}[\bar{L}] & & \\ & \cdots & \cdots & \cdots & \\ & & \bar{q}[0] & \cdots & \bar{q}[\bar{L}] \end{bmatrix} \in C^{n(n_r+1)\times(n+\bar{L})}$$

$$\tau_a(n+\bar{L}) = \begin{bmatrix} a[0] & \cdots & a[L-\bar{L}] & & \\ & \cdots & \cdots & \cdots & \\ & & a[0] & \cdots & a[L-\bar{L}] \end{bmatrix} \in C^{n(n+\bar{L})\times(n+L)}$$

It is known that $\tau_{\bar{q}}(n)$ has a full column rank if $n \geq \bar{L}$, and $\tau_a(n+\bar{L})$ always has the full row rank. Then, for $n \geq \bar{L}$, range$\{\tau_q(n)\}$=range$\{\tau_{\bar{q}}(n)\}$ and range$^{\perp}\{\tau_q(n)\}$=range$^{\perp}\{\tau_{\bar{q}}(n)\}$ where range $\perp$ is orthogonal complement of range. The dimension of range$^{\perp}\{\tau_q(n)\}$ is $n^{\perp}=n(n_r+1)-(n+L)=nn_r-L$ which is positive for any $n_r \geq 1$ if $n>L$.

With unknown $\bar{L}$, $n \geq L+1$ can be chosen to construct $\tau_q(n)$. Then, from the rank of $\tau_q(n)$ which is $n_{rank}=n+\bar{L}$, $\bar{L}=n_{rank}-n$ can be determined. If the SVD of $\tau_q(n)$ is denoted as $\tau_q(n) = \Sigma_{i=1}^{n_{rank}} \sigma_i u_i v_i^H = U\Sigma V^H$ where $U=[u_1, \ldots, u_{n_{rank}}]$, $P_U^{\perp} = I-UU^H$ can be constructed (This step can be replaced by rank-revealing QR decomposition.) Then, $\bar{q}\{z\}$ can be found by $$\min_{\bar{q}\{z\}} \|P_U^{\perp}\tau_{\bar{q}}(n)\|^2 \qquad (2.26)$$

which is a quadratic minimization and has a unique solution.

One embodiment achieves a higher accuracy by using the estimate from (2.26) as an initial estimate of $\bar{q}\{z\}$ in an alternate least square fitting algorithm that minimizes the difference between the left and right of the equation (2.24).

The shortened prefilter $\bar{q}\{z\}$ may have a bandwidth larger than W. One embodiment uses a low pass filter in the D-to-A processor that converts each element in $\bar{q}\{z\}$ to an analog waveform. After the low pass filter, the waveform may become longer. But the shortened prefilter $\bar{q}\{z\}$ along with a common low pass filter may be easier to implement than the original prefilter $q\{z\}$.

Finding all Shortest Prefilters Jointly

The discrete-time version of (2.5) in Z-domain can be written as $$H\{z\}g^{(i)}\{z\}=0 \qquad (2.27)$$

where $H\{z\}=\Sigma_{l=0}^{L_H} H[l]z^{-l}$ which has the dimension $n_r \times n_t$ with $n_t > n_r$, and $g^{(i)}\{z\}=\Sigma_{l=0}^{L_i} g^{(i)}[l]z^{-l}$.

$H\{z\}$ can be assumed to have a normal rank equal to $n_r$, i.e., all rows of $H\{z\}$ are independent for almost all $z \in C$, which is equivalent to the property that all rows of $H(t)$ are convolutively independent. This condition can be met easily in practice especially when the first $n_r$ transmitters are placed pairwisely near the $n_r$ receivers.

Then, it is known from the rational vector space theory that there are $n_t-n_r$ independent vectors $g^{(i)}\{z\}$, of the minimum degrees (or lengths), satisfying (2.27). One embodiment comprises an iterative procedure for finding a set of these $n_t-n_r$ minimum length prefilters as presented below.

It follows from (2.27) that $$S_H(\hat{L}_i) = \begin{bmatrix} H[0] & & \\ \cdots & \cdots & \\ H[L_H] & \cdots & H[0] \\ & \cdots & \cdots \\ & & H[L_H] \end{bmatrix} \in C^{n_r(L_H+\hat{L}_i+1)\times n_t(\hat{L}_i+1)}$$

$$v_g(\hat{L}_i) = \begin{bmatrix} g[0] \\ \cdots \\ g[\hat{L}_i] \end{bmatrix} \in C^{n_t(\hat{L}_i+1)\times 1}$$

and $\hat{L}$ is a reference degree for $g\{z\}$. Note that there is a one-to-one mapping between $v_g(\hat{L}_i)$ and $g\{z\}$ of degree $\hat{L}_i$. It is clear that if $g^{(i)}\{z\}$ of degree $L_i$ is a solution to (2.27) then $v_g(\hat{L}_i)$ of $g^{(i)}\{z\}$ with $g[l]=0$ for $L_i+1 \leq l \leq \hat{L}_i$ must be a solution to (2.28) with $\hat{L}_i \geq L_i$. Also note that if $g^{(i)}\{z\}$ of degree $L_i$ is a solution to (2.27), so is $g^{(i)}\{z\}z^{-m}$ for any $m \geq 0$. Therefore, $v_{z^{-m}g^{(i)}}(\hat{L}_i)$ for $0 \leq m \leq \hat{L}_i-L_i$ must also be solutions to (28) with $\hat{L}_i \geq L_i$. It is also easy to verify that $v_{z^{-m}g^{(i)}}(\hat{L}_i)$ for $0 \leq m \leq \hat{L}_i-L_i$ are independent vectors in $C^{n_t(\hat{L}_i+1)\times 1}$.

To find the total $n_t-n_r$ independent minimum-degree vectors $g\{z\}$ in $P^{n_t \times 1}$, a smallest $\hat{L}_1$ may be started with such that (2.28) has a solution. Then, set $L_1=\hat{L}_1$ and record the number $n_1$ of the independent solutions with the degree $L_1$. These $n_1$ solutions $v_g^{(i)}(L_1)$, $i=1, \ldots, n_1$ correspond to $g^{(i)}\{z\}$, $i=1, \ldots, n_1$. Without loss of generality, it can be assumed that $m_k=n_1+\ldots+n_k<n_t-n_r$ independent minimum-degree vectors $g^{(ij)}\{z\}$ of degree $L_j$ where $i_j=m_{j-1}+1, \ldots, m_j$, $j=1, \ldots, k$ and $L_1 < \ldots < L_k$ have been found. A smallest $\hat{L}_{k+1} > L_k$ may be chosen such that there is a solution to the following equation:

$$S_H(\hat{L}_{k+1})P_k v_g(\hat{L}_{k+1})=0 \qquad (2.29)$$

where $P_k=I-Q_k Q_k^H$, the orthonormal matrix $Q_k$ is from the QR decomposition $M_k=Q_k R_k$, and $M_k$ consists of all the following column vectors:

$v_{z^{-m}g^{(ij)}}(\hat{L}_{k+1})$ where $0 \leq m \leq \hat{L}_{k+1}-L_j, m_{j-1}+1 \leq i_j \leq m_j, 1 \leq j \leq k$ Then, set $L_{k+1}=\hat{L}_{k+1}$, record the number $n_{k+1}$ of independent solutions to (2.29), update $m_{k+1}=m_k+n_{k+1}$, and determine the $n_{k+1}$ independent minimum-degree vectors $g^{(i)}\{z\}$ of degree $L_{k+1}$ where $m_k+1 \leq i \leq m_{k+1}$. If $m_{k+1}=n_t-n_r$, the computation is completed. Otherwise, repeat the previous process with k increased by one. Obviously, we can set $P_0=I$ in (2.29).

In another embodiment, the solution to (2.29) is replaced by the least square solution for better numerical stability. This embodiment further comprises keeping the least squared error very small for each iteration index k to prevent the error from propagating and deteriorating the quality of the subsequent iterations.

The prefilters generated from the embodiments in this subsection are the shortest possible. Similar to the embodiments in the previous subsection, the shortened prefilters are further processed (either implicitly or explicitly) by a common low pass filter to meet the bandwidth constraint.

Although the foregoing descriptions of the preferred embodiments of the present invention have shown, described, or illustrated the fundamental novel features or principles of the invention, it is understood that various omissions, substitutions, and changes in the form of the detail of the methods, elements or apparatuses as illustrated, as well as the uses thereof, may be made by those skilled in the art without departing from the spirit of the present invention. Hence, the scope of the present invention should not be limited to the foregoing descriptions. Rather, the principles of the invention may be applied to a wide range of methods, systems, and apparatuses, to achieve the advantages described herein and to achieve other advantages or to satisfy other objectives as well. Although the invention has been discussed with respect to various embodiments, it should be recognized that the invention comprises the novel and non-obvious claims supported by this disclosure.

What is claimed is:

1. A method useful for full duplex radio communications, comprising:
   transmitting a training signal by a node in a radio network;
   extracting a waveform from a version of the training signal obtained from a receive chain of the node;
   generating a cancellation signal using the waveform;
   applying the cancellation signal to the receive chain of the node; and
   iteratively:
       transmitting the training signal, at increased power compared to prior transmissions of the training signal, by the node in the radio network,
       extracting a further waveform from a version of the training signal transmitted at increasing power obtained from the receive chain of the node,
       generating a further cancellation signal using the further waveform and the cancellation signal, and
       applying the further cancellation signal to the receive chain of the node.

2. The method of claim 1, wherein the cancellation signal is determined using a sliding window weighted sum of the waveform.

3. The method of claim 2, wherein coefficients of a signal to be transmitted comprise weights of the weighted sum.

4. The method of claim 1, wherein the training signal is transmitted over a first antenna of the node, the receive chain is coupled to a second antenna of the node, and the version of the training signal obtained from the receive chain is a version of the training signal received by the second antenna.

5. The method of claim 1, wherein the training signal is transmitted over a first antenna of the node, the receive chain is coupled to the first antenna, and the receive chain receives the training signal through a circulator.

6. The method of claim 1, wherein the node includes $n_r$ receive antennas and $n_t$ transmit antennas, and further comprising transmitting a training signal $a_i$ by each of the $n_t$ transmit antennas, and wherein the version of the training signal obtained from the receive chain is a version of a combination of the $a_i$ transmitted signals.

7. The method of claim 6, wherein each of the $a_i$ transmitted signals are different signals.

8. The method of claim 6, wherein, for each of the $n_r$ receive antennas, the following is performed,
   extracting a waveform from a version of the training signal obtained from a receive chain of the node,
   generating a cancellation signal using the waveform, and
   applying the cancellation signal to the receive chain of the node.

* * * * *